United States Patent
Wang et al.

(10) Patent No.: US 12,250,383 B2
(45) Date of Patent: Mar. 11, 2025

(54) DYNAMIC PARAMETER SELECTION FOR QUALITY-NORMALIZED VIDEO TRANSCODING

(71) Applicant: Google LLC, Mountain View, CA (US)

(72) Inventors: Yilin Wang, Sunnyvale, CA (US); Balineedu Adsumilli, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 15 days.

(21) Appl. No.: 17/911,245

(22) PCT Filed: May 19, 2020

(86) PCT No.: PCT/US2020/033538
§ 371 (c)(1),
(2) Date: Sep. 13, 2022

(87) PCT Pub. No.: WO2021/236059
PCT Pub. Date: Nov. 25, 2021

(65) Prior Publication Data
US 2023/0104270 A1    Apr. 6, 2023

(51) Int. Cl.
*H04N 19/00* (2014.01)
*H04N 19/149* (2014.01)
(Continued)

(52) U.S. Cl.
CPC ......... *H04N 19/154* (2014.11); *H04N 19/149* (2014.11); *H04N 21/2743* (2013.01)

(58) Field of Classification Search
CPC ............... H04N 19/154; H04N 19/149; H04N 21/2743; H04N 21/23418;
(Continued)

(56) References Cited

U.S. PATENT DOCUMENTS

| | | | | |
|---|---|---|---|---|
| 5,790,839 A | * | 8/1998 | Luk | G11C 5/025 713/300 |
| 5,901,304 A | * | 5/1999 | Hwang | G11C 7/22 365/230.06 |

(Continued)

FOREIGN PATENT DOCUMENTS

WO    2019/117864 A1    6/2019

OTHER PUBLICATIONS

Liu et al. "Visual quality assessment: recent developments, coding applications and future trends" SIP (2013), vol. 2, e4, p. 1 of 20 ©, 2013.*

(Continued)

*Primary Examiner* — Frank F Huang
(74) *Attorney, Agent, or Firm* — Young Basile Hanlon & MacFarlane, P.C.

(57) ABSTRACT

Video streams uploaded to a video hosting platform are transcoded using quality-normalized transcoding parameters dynamically selected using a learning model. Video frames of a video stream are processed using the learning model to determine bitrate and quality score pairs for some or all possible transcoding resolutions. The listing of bitrate and quality score pairs determined for each resolution is processed to determine a set of transcoding parameters for transcoding the video stream into each resolution. The bitrate and quality score pairs of a given listing may be processed using one or more predefined thresholds, which may, in some cases, refer to a weighted distribution of resolutions according to watch times of videos of the video hosting platform. The video stream is then transcoded into the various resolutions using the set of transcoding parameters selected for each resolution.

20 Claims, 9 Drawing Sheets

(51) Int. Cl.
*H04N 19/154* (2014.01)
*H04N 21/2743* (2011.01)

(58) Field of Classification Search
CPC ..... H04N 21/234363; H04N 21/23439; H04N 21/251; H04N 21/25891; H04N 21/2662; H04N 21/4666
See application file for complete search history.

(56) References Cited

U.S. PATENT DOCUMENTS

| | | | | |
|---|---|---|---|---|
| 6,072,834 A * | 6/2000 | Kim | ...................... | H04N 19/176 |
| | | | | 382/250 |
| 6,097,756 A * | 8/2000 | Han | ...................... | H04N 19/537 |
| | | | | 375/240 |
| 6,580,754 B1 * | 6/2003 | Wan | ...................... | H04N 19/33 |
| | | | | 375/E7.079 |
| 6,728,317 B1 * | 4/2004 | Demos | .................. | H04N 19/36 |
| | | | | 348/E7.015 |
| 6,765,962 B1 * | 7/2004 | Lee | ...................... | H04N 19/124 |
| | | | | 375/240.03 |
| 6,771,703 B1 * | 8/2004 | Oguz | ..................... | H04N 19/59 |
| | | | | 375/240.03 |
| 6,826,232 B2 * | 11/2004 | Chen | ..................... | H04N 19/14 |
| | | | | 375/240.18 |
| 7,016,412 B1 * | 3/2006 | van Zon | ............. | H04N 19/156 |
| | | | | 375/240.1 |
| 7,095,782 B1 * | 8/2006 | Cohen | ................ | H04N 21/2404 |
| | | | | 375/E7.02 |
| 7,245,662 B2 * | 7/2007 | Piche | .................... | H04N 19/46 |
| | | | | 382/250 |
| 7,263,124 B2 * | 8/2007 | Peng | ..................... | H04N 19/34 |
| | | | | 375/240.03 |
| 7,369,610 B2 * | 5/2008 | Xu | ................. | H04N 21/234327 |
| | | | | 375/E7.091 |
| 7,391,807 B2 * | 6/2008 | Lin | ...................... | H04N 19/124 |
| | | | | 375/240.03 |
| 7,477,688 B1 * | 1/2009 | Zhang | .................... | H04N 19/40 |
| | | | | 375/240 |
| 7,627,034 B2 * | 12/2009 | Park | ..................... | H04N 19/46 |
| | | | | 375/240.08 |
| 7,697,608 B2 * | 4/2010 | Lee | ...................... | H04N 19/14 |
| | | | | 375/240.03 |
| 7,729,421 B2 * | 6/2010 | Campisano | .......... | H04N 19/577 |
| | | | | 375/240.01 |
| 8,040,952 B2 * | 10/2011 | Park | ................... | H04N 21/4347 |
| | | | | 375/240.01 |
| 8,189,659 B2 * | 5/2012 | Han | ................. | H04N 21/43637 |
| | | | | 375/240.02 |
| 8,494,042 B2 * | 7/2013 | Park | ..................... | H04N 19/513 |
| | | | | 375/240 |
| 9,615,098 B1 | 4/2017 | Yi et al. | | |
| 10,225,565 B2 * | 3/2019 | Lee | ........................ | H04N 19/70 |
| 10,931,951 B2 * | 2/2021 | Misra | ..................... | H04N 19/13 |
| 11,095,916 B2 * | 8/2021 | Seregin | .................. | H04N 19/70 |
| 11,290,714 B2 * | 3/2022 | Kim | ..................... | H04N 19/176 |
| 11,297,320 B2 * | 4/2022 | Lai | ........................ | H04N 19/70 |
| 11,363,298 B2 * | 6/2022 | Lee | ...................... | H04N 19/172 |
| 11,405,649 B2 * | 8/2022 | Hsu | ....................... | H04N 19/70 |
| 11,516,483 B2 * | 11/2022 | Choi | .................... | H04N 19/105 |
| 2006/0034374 A1 * | 2/2006 | Park | ......................... | G06T 7/20 |
| | | | | 348/E5.066 |
| 2007/0064791 A1 * | 3/2007 | Okada | ................... | H04N 19/63 |
| | | | | 375/E7.125 |
| 2009/0028245 A1 * | 1/2009 | Vieron | ................ | H04N 19/109 |
| | | | | 375/E7.123 |
| 2011/0060792 A1 | 3/2011 | Ebersviller | | |
| 2011/0243231 A1 * | 10/2011 | Li | ........................ | H04N 19/433 |
| | | | | 375/E7.256 |
| 2011/0268175 A1 * | 11/2011 | Tan | ...................... | H04N 19/895 |
| | | | | 375/E7.026 |
| 2013/0028324 A1 * | 1/2013 | Chang | ................. | H04N 19/433 |
| | | | | 375/E7.125 |
| 2014/0092970 A1 * | 4/2014 | Misra | .................... | H04N 19/52 |
| | | | | 375/240.16 |
| 2016/0021376 A1 | 1/2016 | Andreopoulos et al. | | |
| 2016/0112704 A1 * | 4/2016 | Grange | ................. | H04N 19/85 |
| | | | | 375/240.12 |
| 2017/0085917 A1 * | 3/2017 | Hannuksela | ......... | H04N 19/136 |
| 2017/0214937 A1 * | 7/2017 | Lin | ...................... | H04N 19/577 |
| 2018/0027247 A1 * | 1/2018 | Lee | ...................... | H04N 19/188 |
| | | | | 375/240.02 |
| 2018/0124146 A1 | 5/2018 | Chen et al. | | |
| 2018/0376126 A1 * | 12/2018 | Hannuksela | ......... | H04N 13/161 |
| 2019/0208207 A1 * | 7/2019 | Misra | ................... | H04N 19/577 |
| 2020/0213617 A1 * | 7/2020 | Choi | ..................... | H04N 19/51 |
| 2020/0236377 A1 * | 7/2020 | Choi | .................... | H04N 19/174 |
| 2020/0260070 A1 * | 8/2020 | Yoo | ....................... | H04N 19/70 |
| 2021/0168404 A1 * | 6/2021 | Lim | ..................... | H04N 19/513 |
| 2021/0204000 A1 * | 7/2021 | Wang | .................... | H04N 19/96 |
| 2021/0274176 A1 * | 9/2021 | Kang | ................... | H04N 19/157 |
| 2021/0321100 A1 * | 10/2021 | Hendry | ............... | H04N 19/184 |

OTHER PUBLICATIONS

International Search Report and Written Opinion of International Application No. PCT/US2020/033538 dated Oct. 12, 2020; 15 pgs.

Dong Liu et al., "Deep Learning-Based Video Coding: A Review and A Case Study", arXiv: 1904.12462v1 [cs.MM] Apr. 29, 2019, 35 pgs.

Dilip Kumar Krishnappa, "Optimizing the Video Transcoding Workflow in Content Delivery Networks", MMSys 15: Proceedings of the 6th ACM Multimedia Systems Conference, Mar. 2015, pp. 37-48.

* cited by examiner

DYNAMIC PARAMETER SELECTION FOR QUALITY-NORMALIZED VIDEO TRANSCODING

BACKGROUND

Digital video streams may represent video using a sequence of frames or still images. Digital video can be used for various applications including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

A method for transcoding a video stream of user generated video content according to an implementation of this disclosure comprises determining bitrate and quality scores for transcoding the user generated video content of the video stream at multiple resolutions, such as by querying, a learning model trained to predict transcoding quality for sets of user generated video content at the multiple resolutions using information associated with the user generated video content. Sets of transcoding parameters to use for transcoding the video stream at each of the multiple resolutions are selected according to the bitrate and quality scores, in which each of the sets of transcoding parameters corresponds to a different resolution of the multiple resolutions. The video stream is transcoded into multiple transcoded video streams using the selected sets of transcoding parameters. Each of the multiple transcoded video streams is transcoded at the different resolution corresponding the set of the transcoding parameters used for the transcoding. The multiple transcoded video streams are then output for further processing or storage. A transcoded video stream of the multiple transcoded video streams is configured for display at a client device responsive to a selection of a resolution corresponding to the transcoded video stream.

In some implementations of the method, determining the bitrate and quality scores for transcoding the user generated video content of the video stream at the multiple resolutions comprises receiving, as output of the learning model, predicted delivered quality levels of the video stream for the multiple resolutions. A given predicted delivered quality level represents a quality of the video stream when the video stream is transcoded at a specified bitrate for a corresponding one of the multiple resolutions. Sets (or listings) of bitrate and quality score pairs are then determined using the predicted delivered quality levels, in which each set of bitrate and quality score pairs corresponds to one resolution of the multiple resolutions.

In some implementations of the method, the learning model computes the predicted delivered quality levels by processing one or more video frames extracted from the video stream using one or more quality control metrics, in which the information associated with the user generated video content corresponds to the one or more video frames.

In some implementations of the method, each bitrate in a given set of bitrate and quality score pairs is less than or equal to a maximum bitrate allowed for a resolution corresponding to the given set of bitrate and quality score pairs.

In some implementations of the method, selecting the sets of transcoding parameters to use for transcoding the video stream at each of the multiple resolutions comprises, for each of the sets of bitrate and quality score pairs, processing each bitrate and quality score pair of the set of bitrate and quality score pairs using a non-linear optimization function to determine weighted values associated with a resolution corresponding to the set of bitrate and quality score pairs, and selecting, as one of the sets of transcoding parameters, a bitrate and quality score pair of the set of bitrate and quality score pairs resulting in a highest one of the weighted values.

In some implementations of the method, the non-linear optimization function processes the bitrate and quality score pairs of each set of bitrate and quality score pairs using one or more predefined thresholds.

In some implementations of the method, the one or more predefined thresholds relate to one or more of an overall bitrate upper bound, a maximum bitrate allowed at some or all of the multiple resolutions, or a visual quality difference measurement threshold.

In some implementations of the method, when the one or more predefined thresholds relate to the visual quality difference measurement threshold, processing each bitrate and quality score pair of the set of bitrate and quality score pairs using the non-linear optimization function comprises culling ones of the bitrate and quality score pairs which breach the visual quality difference measurement threshold. The weighted values are then determined for remaining ones of the bitrate and quality score pairs.

In some implementations of the method, the one or more predefined thresholds relate to a weight defined for the resolution corresponding to the set of bitrate and quality score pairs, and processing each bitrate and quality score pair of the set of bitrate and quality score pairs using the non-linear optimization function comprises determining a weighted value for a bitrate and quality score pair of the set of bitrate and quality score pairs by weighting the quality score of the bitrate and quality score pair using the weight.

In some implementations of the method, the multiple transcoded video streams are output to a video hosting platform, in which weights defined for each of the multiple resolutions are determined based on watch time distributions for the multiple resolutions across videos uploaded to the video hosting platform.

In some implementations of the method, the multiple transcoded video streams are output to a video hosting platform. Raw video frames are extracted from sets of user generated video content of the video hosting platform, and the learning model is trained using video content of the raw video frames.

A further implementation of this disclosure provides a method of training a learning model to predict transcoding quality for user generated video content at multiple resolutions. Initially one or more raw frames are extracted from an input video, and each extracted raw frame is transcoded into one or more, and optionally all, video formats with a resolution up to the resolution of the input video, and for multiple transcoding configurations. The training method comprises providing labelled transcoded versions as input to the learning model and obtaining predicted values for the bitrate and quality score. The parameters of the learning model may be adjusted based on a comparison of the predicted values for the bitrate and quality score with the corresponding labelled bitrate and quality score.

In some implementations of the methods, the raw video frames are pre-processed prior to training the learning model using the video content of the raw video frames.

In some implementations of the methods, pre-processing the raw video frames comprises converting pixel data of the raw video frames from RGB color channels to YUV color channels, in which the learning model is trained using only the pixel data corresponding to a Y color channel of the YUV color channels.

In some implementations of the methods, pre-processing the raw video frames comprises determining whether one or more of the raw video frames are in a non-standard resolution. Responsive to determining that the one or more of the raw video frames are in the non-standard resolution, the one or more of the raw video frames are rescaled to the standard resolution by padding the one or more of the raw video frames with zero value coefficients.

In some implementations of the methods, training the learning model using the video content of the raw video frames comprises processing a video frame of the raw video frames using a feature map generated for predicting spatial or temporal features of the video frame.

In some implementations of the methods, the feature map is a two-dimensional map of spatial features generated using a Gabor filter.

In some implementations of the methods, the feature map is a two-dimensional optimal flow of temporal features generated using a reference video frame of the video frame.

In some implementations of the methods, the sets of user generated video content correspond to multiple video content categories, wherein the learning model is trained to predict delivered quality levels of the raw video frames according to configurations learned for the multiple video content categories.

An apparatus according to an implementation of this disclosure comprises a memory and a processor, in which the memory includes instructions executable by the processor to perform a method of any of the foregoing implementations.

A transcoder according to an implementation of this disclosure is configured to perform the method of any of the foregoing implementations.

A further implementation of this disclosure comprises a computer-readable memory storing instructions that, when implemented by a processor, cause the processor to perform a method of any of the foregoing implementations.

These and other aspects of this disclosure are disclosed in the following detailed description of the implementations, the appended claims, and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Figure 1:
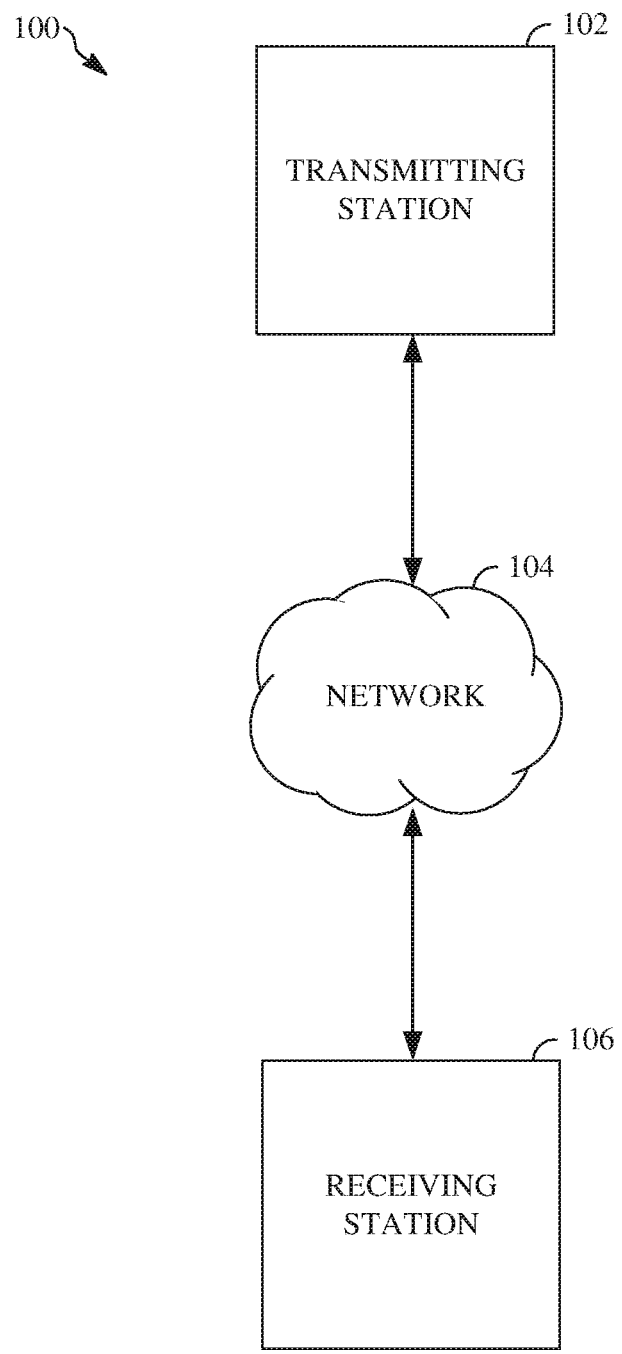
FIG. 1 is a schematic of an example of a video encoding and decoding system.

Video compression schemes may include breaking respective images, or frames, into smaller portions, such as blocks, and generating a compressed bitstream using techniques to limit the information included for respective blocks in the output. The compressed bitstream can be decoded to re-create the source images from the limited information. Typical video compression techniques include reducing the bitrate of a video stream, such as to reduce transmission costs for video hosting and serving platforms. Compression may be performed as part of or otherwise in connection with the transcoding of video content, such as to convert aspects of the video content from one format to another. For example, when user generated video content is uploaded to a video hosting platform, video stream representing the user generated content may be compressed and transcoded for later viewing on the video hosting platform.

Video hosting platforms conventionally transcode uploaded video content into multiple target resolutions before serving the video content to platform users. For example, a video received at a resolution of 1080p may be transcoded into 360p, 480p, 720p, and possibly other resolution formats. When a user of such a video hosting platform requests to view a hosted video, the platform selects a target format to serve to the user based on input criteria such as network conditions and user device capabilities. In some cases, the platform may select the target format expected to deliver the highest quality of the video to the user based on those input criteria. For example, where a user's network conditions and user device capabilities are able to support a 1080p resolution format of a video, the video hosting platform may serve that format version. This is because the higher resolution is associated with a higher playback quality and further because the relatively high bitrate requirements required to support playback at that resolution are attainable by the user's network conditions and user device capabilities.

However, information other than network conditions and user device capabilities may be significant for maximizing a delivered quality of a video to a user of a video hosting platform. In particular, compression bitrate is an important indicator on the effect of compression on video quality, and the influence of bitrate depends largely on the actual content of a video. Thus, videos with different content compressed at the same bitrate will potentially have very different video quality. Typical video transcoding approaches both process transcoded targets independently of one another with fixed parameters and without considering the potential variance of video content itself. As such, the quality of a video transcoded at a highest resolution may still suffer from noticeable compression artifacts or even become much worse by the transcoding, such as where the transcoding parameters used are improperly selected.

One solution is to align the quality of videos at given resolutions by conducting an exhaustive search across the entire transcoding space to find all possible bitrates and qualities. Such a solution first involves generating multiple targets for each resolution across all resolutions and then computing different quality metrics (e.g., peak signal to noise ratio (PSNR) values) for each target. A determination can then be made as to which targets fit within an acceptable range for a predefined quality level. For example, a 480p target video should have a PSNR value of around 35, and a 720p target video should have a PSNR value above 40. This process is then repeated at each resolution available for transcoding. Once it is completed, an optimal target transcoding for the video can be selected. However, given the wide variety of transcoding resolutions and quality metrics, this solution is highly time consuming and computationally expensive. In some cases, it actually may become infeasible given the prohibitive computing expense of generating all possible targets in a full transcoding pipeline.

Implementations of this disclosure address problems such as these by maximizing the delivered quality of videos by dynamically selecting quality-normalized transcoding parameters using a learning model trained to predict transcoding quality for sets of user generated video content at different resolutions. When a video hosting platform receives a video stream for transcoding, information associated with the user generated video content (for example, video frames of the video stream) is processed using the learning model to determine bitrate and quality score pairs for some or all possible transcoding resolutions. The bitrate and quality score pairs represent a predicted quality level of the video stream when it is transcoded at the stated bitrate for a given resolution. The set (or listing) of bitrate and quality score pairs determined for each resolution is then processed to determine, for each resolution, a set of transcoding parameters to use to transcode the video stream into that resolution. In particular, the various bitrate and quality score pairs of a given set may be processed using one or more predefined thresholds, which may, for example, refer to a weighted distribution of resolutions according to watch times of videos of the video hosting platform. The video stream is then transcoded into the various resolutions using the set of transcoding parameters selected for each resolution.

Advantages of the techniques described herein include the ability to produce, such as by training, based on a data set, a learning model to predict transcoding quality for sets of user generated video content at multiple resolutions, and the ability to use the produced model, such as for inference, to optimize dynamic parameter selection for quality-normalized video transcoding. In particular, the techniques described herein enable a learning model to be generated that is configured to output an estimate of bitrate requirements and video quality, which could be used, for example, to select parameters to use to optimally transcode video content in a way that maximizes the deliverable quality of that content or otherwise in connection with a process for transcoding a video stream, such as which may be uploaded to a video hosting platform.

The techniques described herein accomplish significant computational cost and latency savings over the approaches implemented in conventional transcoding pipelines. In particular, as described above, the computational cost for a full range of transcoding for user generated video content in a conventional transcoding pipeline is calculated as the number of possible transcoding configurations multiplied by the number of possible output resolutions multiplied by the sum of the cost to decode and encode the given input video stream. However, the techniques described herein, which instead use bitrate and quality scores predicted using a trained learning model to select optimal transcoding parameters, only needs to decode the given input video stream once. That is, the target bitrate and quality score pairs for the various target transcoding resolutions are obtained by a single query to the learning model, which carries an overall cost in the same magnitude as the cost to decode the given input video stream, which in any event is much smaller than the cost to encode the given input video stream.

As used herein, the learning model may be a machine learning model. For example, the machine learning model may be or include one or more of a neural network (e.g., a convolutional neural network, recurrent neural network, or other neural network), decision tree, support vector machine, Bayesian network, genetic algorithm, deep learning system separate from a neural network, or other machine learning model. As used herein, a set of user generated video content is or refers to all or a portion of a video hosted at a video hosting platform, which video includes user generated video content. For example, a set of user generated video content may refer to a video uploaded to the video hosting platform by a user of the video hosting platform.

Further details of techniques for dynamic parameter selection for quality-normalized video transcoding are described herein with initial reference to a system in which they can be implemented. FIG. 1 is a schematic of an example of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
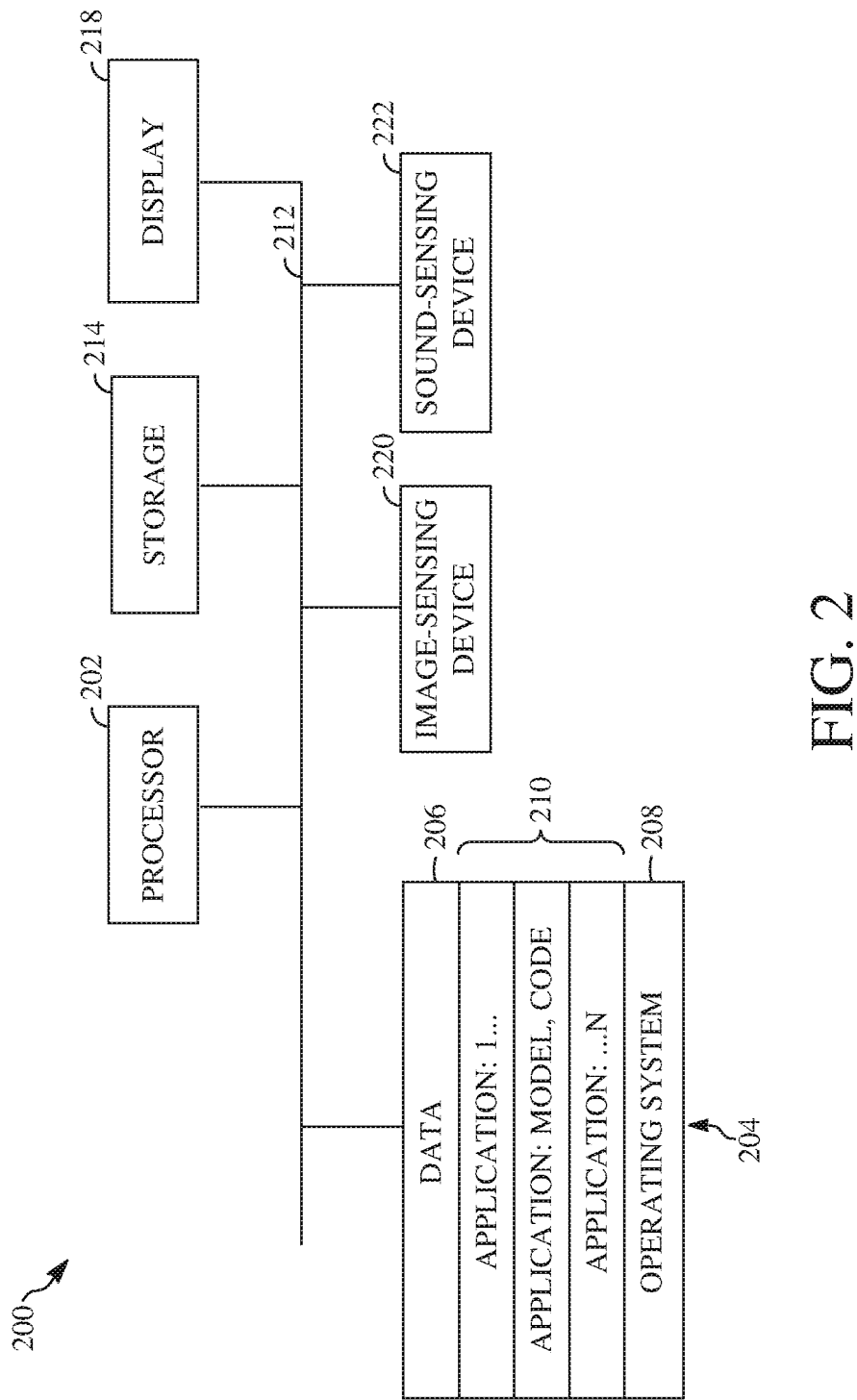
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

In some implementations, the video encoding and decoding system 100 may instead be used to encode and decode data other than video data. For example, the video encoding and decoding system 100 can be used to process image data. The image data may include a block of data from an image. In such an implementation, the transmitting station 102 may be used to encode the image data and the receiving station 106 may be used to decode the image data.

Alternatively, the receiving station 106 can represent a computing device that stores the encoded image data for later use, such as after receiving the encoded or pre-encoded image data from the transmitting station 102. As a further alternative, the transmitting station 102 can represent a computing device that decodes the image data, such as prior to transmitting the decoded image data to the receiving station 106 for display.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random-access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a learning model training application and/or a video stream transcoding application that performs the techniques described herein.

The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into a single unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200.

Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
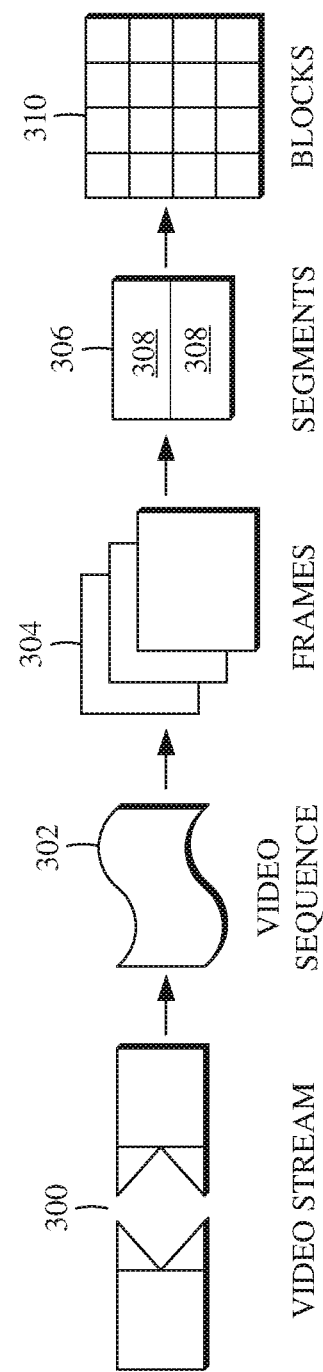
FIG. 3 is a diagram of an example of a video stream to be encoded and decoded.

FIG. 3 is a diagram of an example of a video stream 300 to be encoded and decoded. The video stream 300 includes a video sequence 302. At the next level, the video sequence 302 includes several adjacent frames 304. While three frames are depicted as the adjacent frames 304, the video sequence 302 can include any number of adjacent frames 304. The adjacent frames 304 can then be further subdivided into individual frames, for example, a frame 306.

At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
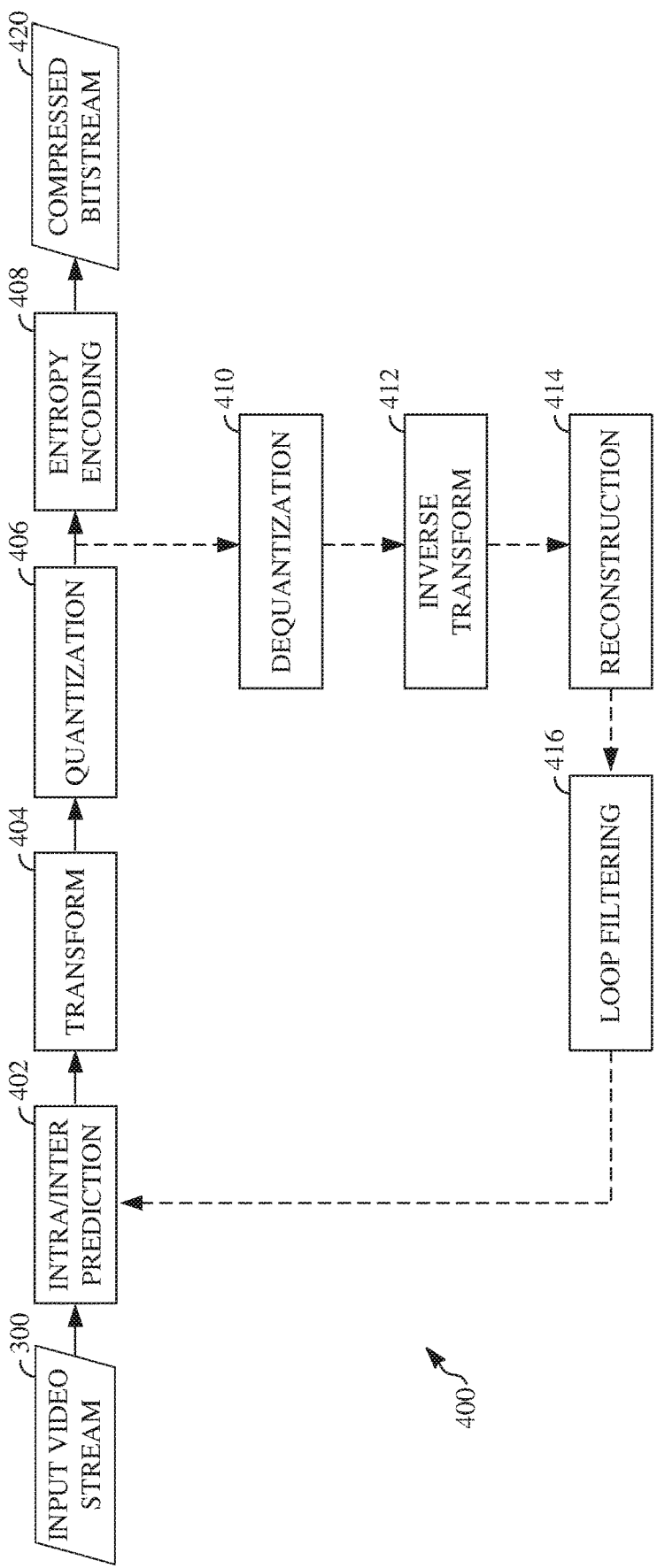
FIG. 4 is a block diagram of an example of an encoder.

FIG. 4 is a block diagram of an example of an encoder 400. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In some implementations, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

In some cases, the functions performed by the encoder 400 may occur after a filtering of the video stream 300. That is, the video stream 300 may undergo pre-processing according to one or more implementations of this disclosure prior to the encoder 400 receiving the video stream 300. Alternatively, the encoder 400 may itself perform such pre-processing against the video stream 300 prior to proceeding to perform the functions described with respect to FIG. 4, such as prior to the processing of the video stream 300 at the intra/inter prediction stage 402.

When the video stream 300 is presented for encoding after the pre-processing is performed, adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual).

At the reconstruction stage 414, the prediction block that was predicted at the intra/inter prediction stage 402 can be added to the derivative residual to create a reconstructed block. The loop filtering stage 416 can apply an in-loop filter or other filter to the reconstructed block to reduce distortion such as blocking artifacts. Examples of filters which may be applied at the loop filtering stage 416 include, without limitation, a deblocking filter, a directional enhancement filter, and a loop restoration filter.

Other variations of the encoder 400 can be used to encode the compressed bitstream 420. In some implementations, a non-transform-based encoder can quantize the residual signal directly without the transform stage 404 for certain blocks or frames. In some implementations, an encoder can have the quantization stage 406 and the dequantization stage 410 combined in a common stage.

Figure 5:
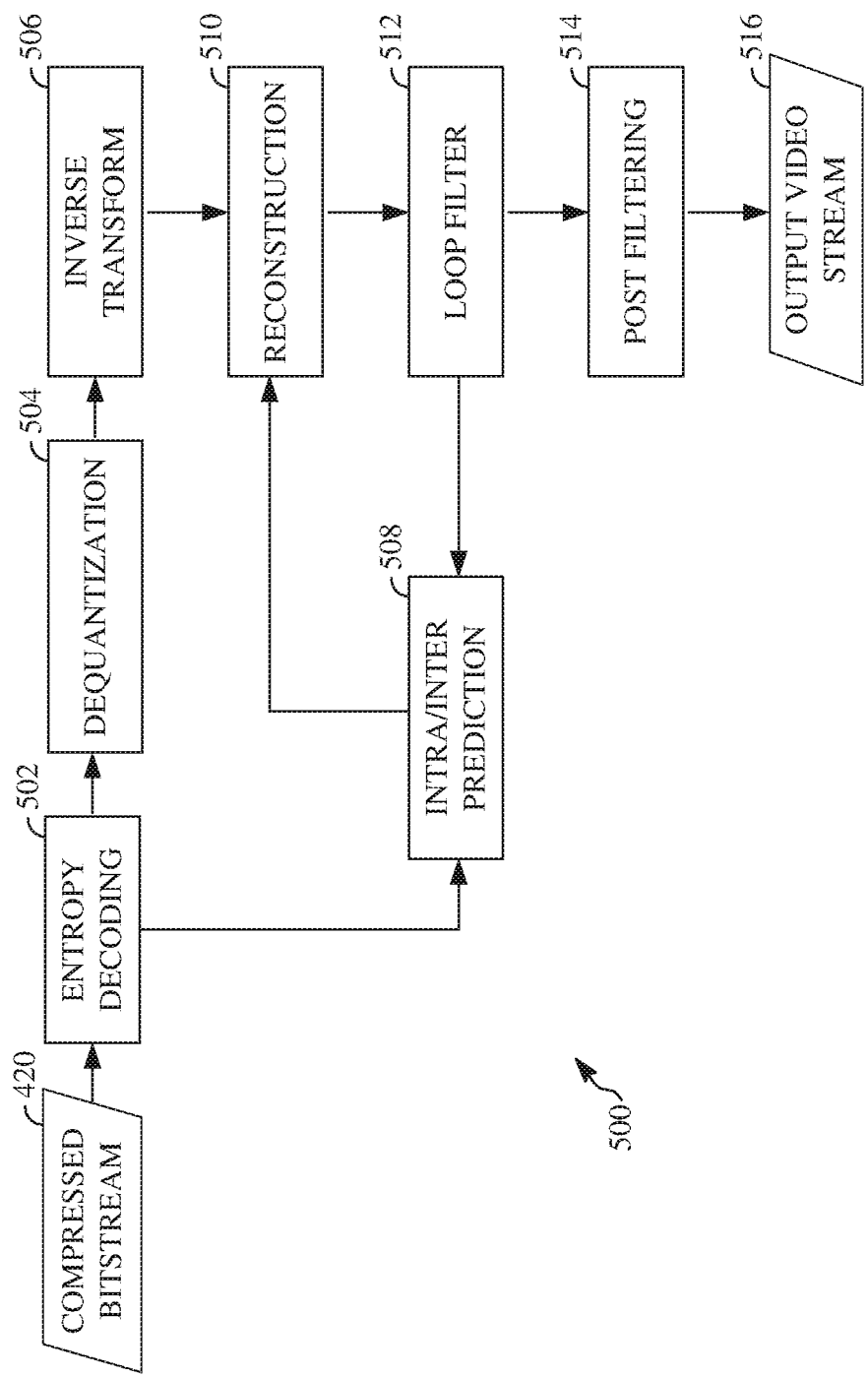
FIG. 5 is a block diagram of an example of a decoder.

FIG. 5 is a block diagram of an example of a decoder 500. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106. In some implementations, the decoder 500 is a hardware decoder.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a post filter stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Examples of filters which may be applied at the loop filtering stage 512 include, without limitation, a deblocking filter, a directional enhancement filter, and a loop restoration filter. Other filtering can be applied to the reconstructed block. In this example, the post filter stage 514 is applied to the reconstructed block to reduce blocking distortion, and the result is output as the output video stream 516. The output video stream 516 can also be referred to as a decoded video stream, and the terms will be used interchangeably herein.

Other variations of the decoder 500 can be used to decode the compressed bitstream 420. In some implementations, the decoder 500 can produce the output video stream 516 without the post filter stage 514 or otherwise omit the post filter stage 514.

Figure 6:
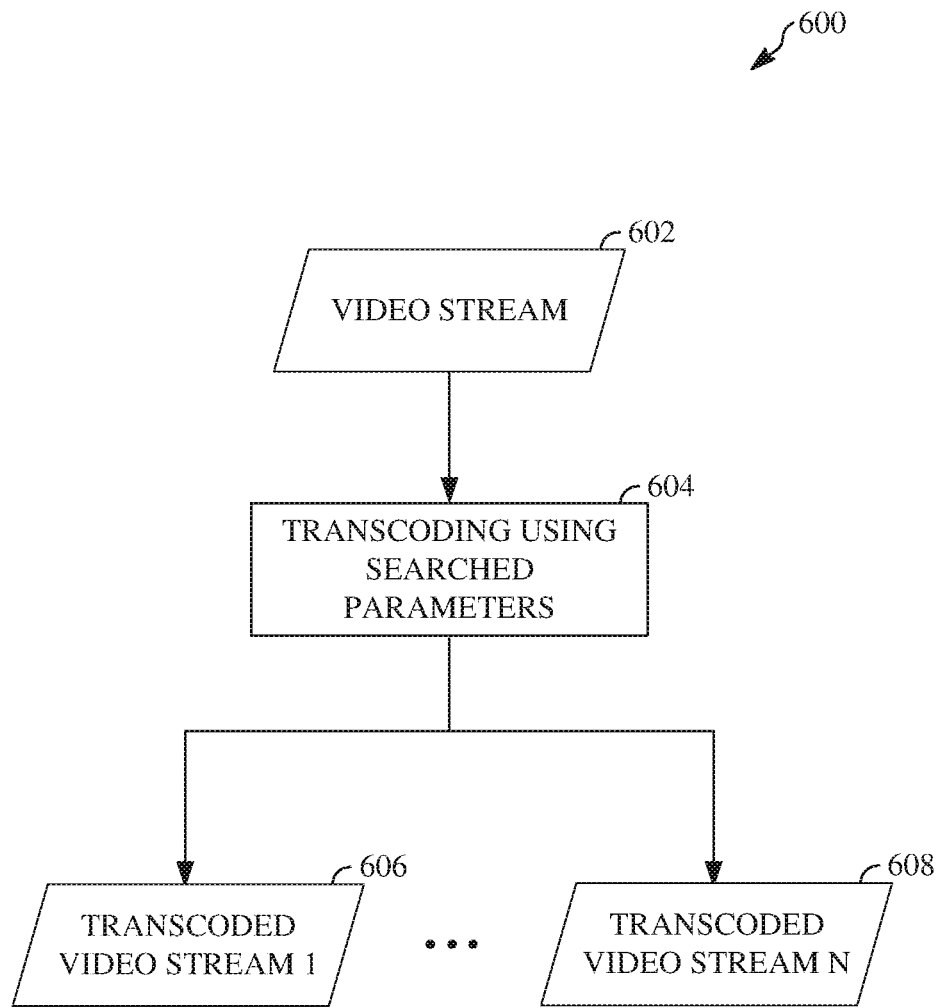
FIG. 6 is a block diagram of an example of a transcoder that uses searched parameters.

FIG. 6 is a block diagram of an example of a transcoder 600 which uses searched parameters. The transcoder 600 can be implemented in the transmitting station 102, such as by providing a computer software program stored in memory, for example, the memory 204. The computer software program can include machine instructions that, when executed by a processor such as the processor 202, cause the transmitting station 102 to transcode video data in the manner described in FIG. 6. The transcoder 600 can also be implemented as specialized hardware included in, for example, the transmitting station 102. In some implementations, the transcoder 600 can be or represent functionality performed in connection with an encoder, such as the encoder 400 shown in FIG. 4. In some implementations, the encoder 400 and the transcoder 600 can be combined into a single computer software program.

The transcoder 600 represents a transcoding pipeline that receives a video stream 602 and transcodes the video stream 602 to produce transcoded content. The video stream 602 may be a compressed bitstream, such as the compressed bitstream 420 shown in FIGS. 4 and 5. For example, the video stream 602 may be received in an encoded form at the transcoder 600. Alternatively, the video stream 602 may be an input video stream, such as the video stream 300 shown in FIG. 3. For example, the video stream 602 may be encoded as part of or in parallel with the transcoding performed at the transcoder 600.

The video stream 602 may be or otherwise represent a video uploaded to a video hosting platform and which is awaiting transcoding for delivery to a user of that video hosting platform. A transcoding stage 604 uses searched parameters to transcode the video stream 602, such as to produce transcoded video streams at different target bitrates and quality levels in the same encoded format and/or to different encoded formats. In the example shown, the transcoding stage 604 produces a transcoded video stream 1 606 at a first resolution and format pair based on the video stream 602, a transcoded video stream (not shown) at a second resolution and format pair based on the video stream 602, through a transcoded video stream N 608 at an $N^{th}$ resolution and format pair based on the video stream 602.

The transcoding stage 604 conducts a search across the transcoding space to determine the parameters for transcoding the video stream 602, such as based on different quality control metric tools, different resolutions, different encoding formats, and the content of the video stream 602. The transcoded video stream 1 606 through the transcoded video stream N 608 represent possible transcoded versions for the video stream 602 using different parameters determined by the searching across the transcoding space. Each of the transcoded video stream 1 606 through the transcoded video stream N 608 may be or otherwise represent a video stream which may be decoded and output for display at a computing device, such as a client device of a user of the video hosting platform which uses the transcoder 600.

Figure 7:
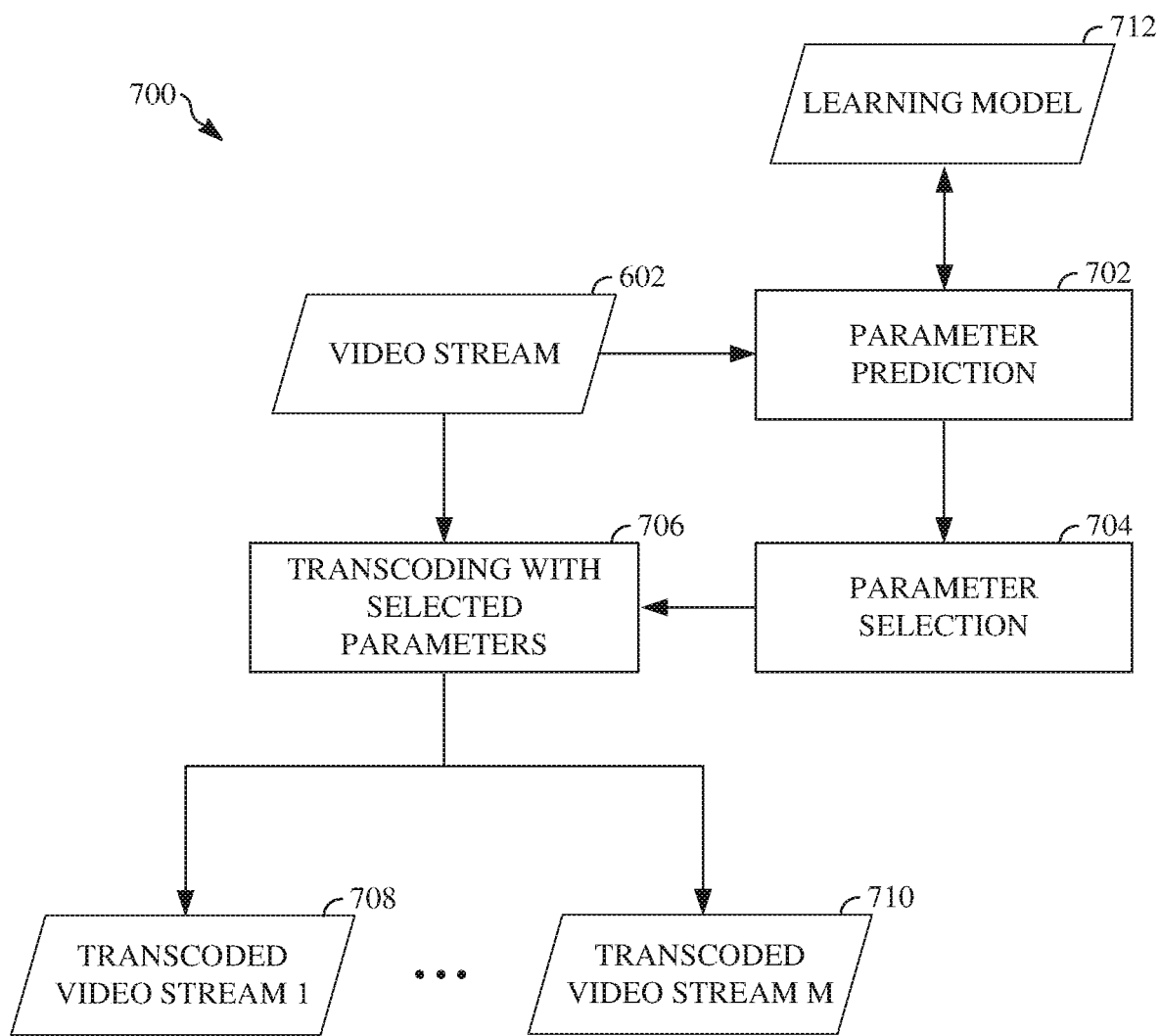
FIG. 7 is a block diagram of an example of a video transcoder that uses a learning model for dynamic parameter prediction and selection.

FIG. 7 is a block diagram of an example of a transcoder 700 that uses a learning model for dynamic parameter prediction and selection. As shown, the transcoder 700 is a variation of the transcoder 600 shown in FIG. 6, such as in which the transcoder 600 has been modified to include a parameter prediction stage 702 and a parameter selection stage 704, and in which the transcoding stage 604 shown in FIG. 6 is replaced with or modified to be a transcoding stage 706 which uses output of the parameter selection stage 704 to transcode the video stream 602. However, in some implementations, the transcoder 700 may instead be another transcoder.

As shown, the transcoder 700 receives the video stream 602 as input and transcodes the video stream 602 using dynamically selected transcoding parameters to produce transcoded content, such as a transcoded video stream 1 708 through a transcoded video stream M 710. The value of M generally refers to the number of different resolutions available for transcoding the video stream 602, such that the video stream 602 is transcoded into as many transcoded video streams as there are resolutions available for the transcoding. The value of M expressed with respect to the transcoded video stream M 710 may be less than or equal to the value of N expressed with respect to the transcoded video stream N 608. That is, in some cases, fewer transcoded video streams may be output by the transcoding stage 706 using the selected parameters than are output by the transcoding stage 604 using the searched parameters.

The parameter prediction stage 702 receives the video stream 602 and uses a learning model 712 trained to predict the transcoding quality of user generated video content to determine bitrate and quality score pairs which may be further processed for transcoding the video stream 602. In particular, the parameter prediction stage 702 uses the learning model 712 to determine bitrate and quality scores computed for transcoding some video frames of the video stream 602 at different resolutions.

The learning model 712 receives the video frames of the video stream 602 as input, such as by the parameter prediction stage 702 querying the learning model using those video frames, and computes predicted delivered quality levels of the video stream 602 for the different resolutions as output. The predicted delivered quality levels indicate quality scores for predicted for the video stream 602, according to a particular quality control metric, when the video stream 602 is transcoded at various bitrates for various resolutions. The learning model 712 is configured to use one or more, but not all, video frames of the video stream 602 as input. In some implementations, however, the learning model 712 can use each video frame of the video stream 602 as input.

The learning model 712 processes the video frames it receives as input using one or more quality control metrics and at one or more possible transcoding resolutions (e.g., 360p, 720p, 1080p, or the like) to compute the predicted delivered quality levels. The quality control metrics are metrics which may be used to measure the quality of video data resulting from transcoding that video data at a specified bitrate for a given resolution. Examples of quality control metrics which may be used by learning model 712 include, but are not limited to, PSNR. PSNR mean opinion score (PSNR MOS), and video multimethod assessment fusion (VMAF).

For each possible resolution into which the video stream 602 may be transcoded, a set (or listing) of bitrate and quality score pairs is determined using the predicted delivered quality levels computed as output by the learning model 712. That is, a first set of bitrate and quality score pairs is determined for a first of the possible resolutions (such as 360p), a second set of bitrate and quality score pairs is determined for a second of the possible resolutions (such as 480p), and so on. Each bitrate and quality score pair of a given set of bitrate and quality score pairs indicates the quality score predicted for the video stream 602 and the bitrate used to achieve that quality score. In that there are many different possible quality outcomes for the video stream 602 after it is transcoded, a set of bitrate and quality score pairs may include a number of bitrate and quality score pairs. Each set of bitrate and quality score pairs may be sorted by quality score or by another means.

In some implementations, the learning model 712 may output the sets of bitrate and quality score pairs. For example, rather than the parameter prediction stage 702 performing some processing against the output of the learning model 712 (e.g., the predicted delivered quality levels) to determine the sets of bitrate and quality score pairs, the learning model 712 may instead be trained to determine those sets of bitrate and quality score pairs using those predicted delivered quality levels. Implementations and examples of techniques for training the learning model 712 are described below with respect to FIG. 9.

The parameter selection stage 704 uses the output of the parameter prediction stage 702 to optimize configurations of the transcoder 700 for transcoding the video stream 602, such as by selecting transcoding parameters based on the output of the parameter prediction stage 702. Because the transcoding parameters are selected using the learning model 712 trained with user generated video content of various categories, the transcoding parameters selected at the parameter selection stage 704 are globally optimized for transcoding the video stream 602 (that is, are optimized across all content categories).

The parameter selection stage 704 processes the sets of bitrate and quality score pairs for each resolution output of the parameter prediction stage 702 against one or more transcoding constraints to select, for one or more of the resolutions, the preferred transcoding parameters for that resolution. The transcoding constraints may include or otherwise refer to predefined thresholds and/or device parameters. For example, the device parameters may be parameters relating to one or more of weights of some or all resolutions or weights of some or all valid transcoding versions. In another example, the predefined thresholds may be thresholds relating to one or more of an overall bitrate upper bound, a maximum bitrate allowed at some or all resolutions, or a visual quality difference measurement threshold for the visual quality scores. The visual quality difference measurement threshold refers to a measure of the change in bitrate required to cause a noticeable change in the delivered quality of a video at a given resolution. The visual quality difference measurement threshold is indicated in units of the quality control metric used for processing the video stream 602, such as VMAF. The quality score determined for the video stream 602, such as at the parameter prediction stage 702, may be normalized by the visual quality difference measurement threshold.

In one implementation, for each possible resolution, the parameter selection stage 704 selects a set of transcoding parameters for transcoding the video stream 602 into that resolution by processing the set of bitrate and quality score pairs for that resolution against a parameter maximizing function. The parameter maximizing function processes each of the sets of bitrate and quality score pairs individually. That is, for each possible resolution, the parameter maximizing function takes in a corresponding set of bitrate and quality score pairs and input and determines the optimal bitrate and quality score pair of that set of score pairs as output.

In one example, the parameter maximizing function may process each pair of a given set of bitrate and quality score pairs by weighting the corresponding resolution according to the quality score of the given pair, with the bitrate constraint that the bitrate of the weighted resolution cannot exceed the overall bitrate upper bound set for all transcoded versions of the video stream 602. A non-linear optimization solution, such as using sequential quadratic programming, may be used to compute weighted values as outputs of the parameter maximizing function. The parameter maximizing function may thus be referred to as a non-linear optimization function.

After weighted value outputs are determined for each of the bitrate and quality score pairs in the set of score pairs for the corresponding resolution, the bitrate and quality score pair corresponding to the highest weighted value output from the parameter maximizing function is selected as the set of transcoding parameters to use for transcoding the video stream 602 at the resolution corresponding to the set of bitrate and quality score pairs. The parameters selected at the parameter selection stage 704 thus include or otherwise refer to, for a resolution of the possible resolutions, the optimal bitrate and quality score pair identified for the corresponding set of bitrate and quality score pairs. As such, transcoding parameters, which include but are not limited to including only a single bitrate and quality score pair, are output from the parameter selection stage 704 for each of the possible transcoding resolutions.

The transcoding stage 706 transcodes the video stream 602 using the transcoding parameters selected at the parameter selection stage 704 for each resolution to produce output transcoded video streams, such as the transcoded video stream 1 708 through the transcoded video stream M 710. In this way, the video stream 602 can be optimally transcoded into multiple different resolutions using the selected transcoding parameters, such as to maximize the delivered quality of the video stream 602 at each of a number of different resolutions.

In some implementations, the set of bitrate and quality score pairs for each resolution can be determined at the parameter selection stage 704 instead of at the parameter prediction stage 702. For example, the parameter prediction stage 702 may output the vector of bitrate and quality scores computed by the learning model 712 to the parameter selection stage 704. In such a case, the parameter selection stage 704 determines the sets of bitrate and quality score pairs for each resolution using the vector received from the parameter prediction stage 702.

In some implementations, the learning model 712 may be one of a plurality of learning models used by the transcoder 700. In some such implementations, each different learning model used by the transcoder 700 may be trained to predict transcoding quality for different categories of user generated video content. For example, a first learning model may be trained based on game streaming video content, a second learning model may be trained based on news show video content, a third learning model may be trained based on lyric music video content, and so on. It has been found that the best transcoding parameters for a particular video may depend on the content category of the video. Multiple learning models may therefore be provided, each learning model trained to predict transcoding quality for user generated video content of one particular content category or of two or more particular content categories. When a video stream is received for transcoding, it may be initially categorized, and assigned to one of the multiple learning models dependent on the category determined for the video stream.

In other such implementations, each different learning model using by the transcoder 700 may be trained to predict transcoding quality for one of the resolutions available for transcoding the video stream 602. For example, a first learning model may be trained to predict the transcoded quality of video streams at 480p, a second learning model may be trained to predict the transcoded quality of video streams at 1080p, and so on. In any such implementation, the training of each of those multiple learning models would be performed as described with respect to the learning model 712.

Figure 8:
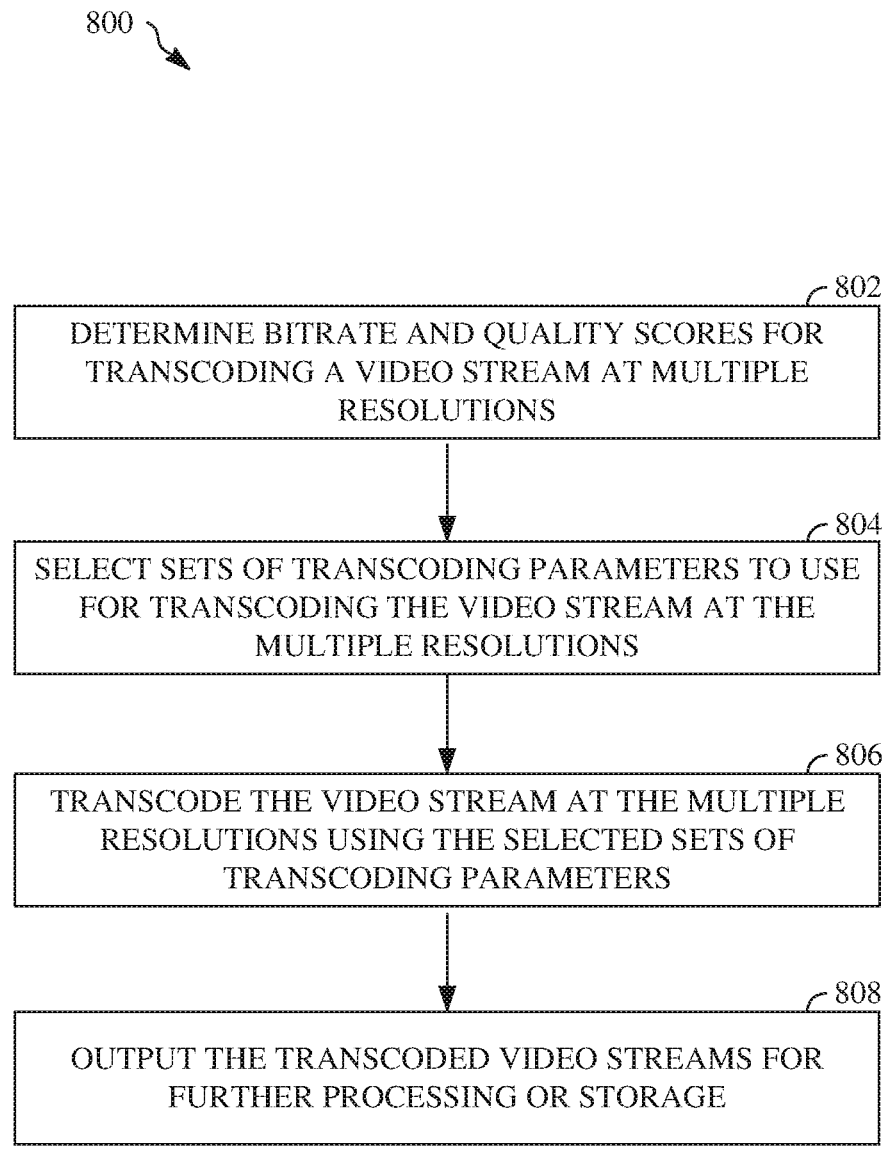
FIG. 8 is a flowchart diagram of an example of a technique for transcoding a video stream using a learning model trained to predict transcoding quality for user generated video content.
Figure 9:
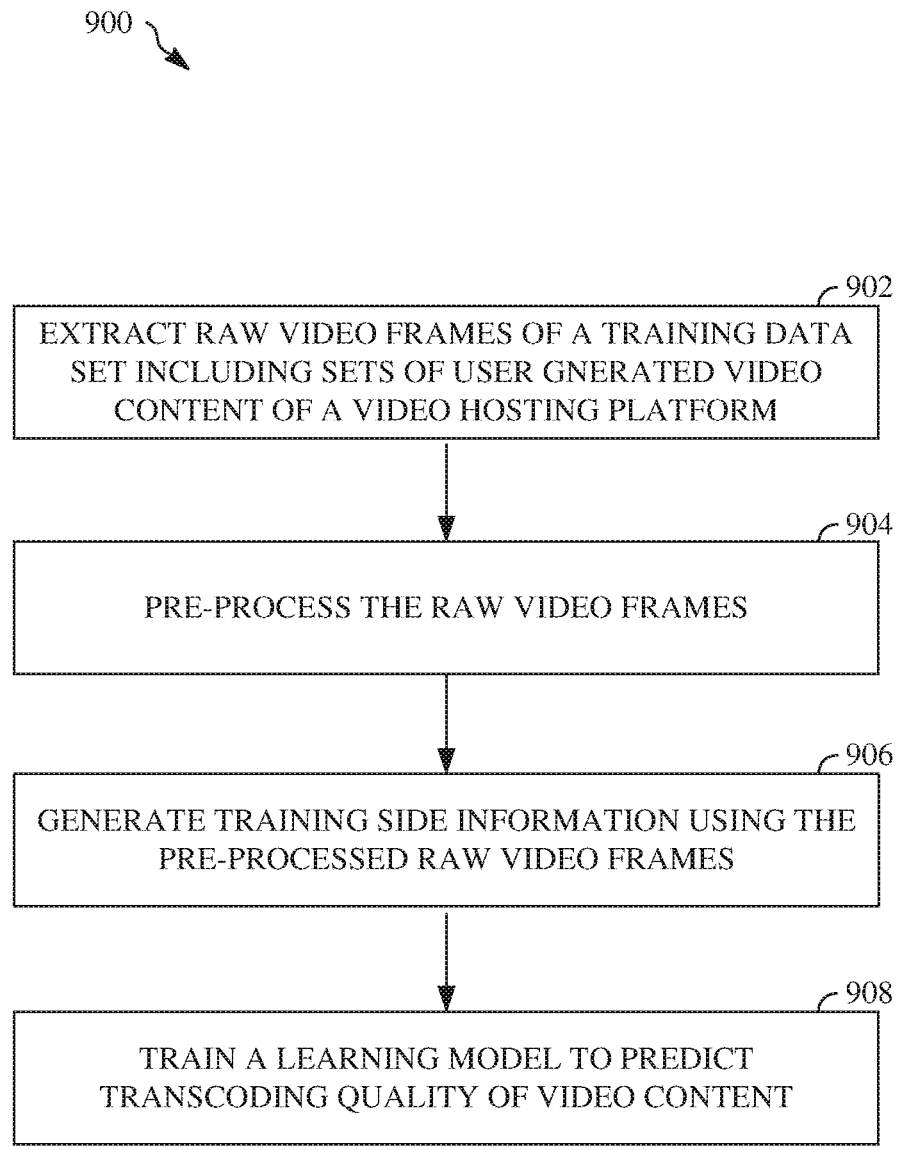
FIG. 9 is a flowchart diagram of an example of a technique for training a learning model to predict transcoding quality for user generated video content.

Further details of techniques for dynamic parameter selection for quality-normalized video transcoding are now described. FIG. 8 is a flowchart diagram of an example of a technique 800 for transcoding a video stream using a learning model trained to predict transcoding quality for user generated video content. FIG. 9 is a flowchart diagram of an example of a technique 900 for training a learning model to predict transcoding quality for user generated video content.

The technique 800 and/or the technique 900 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 800 and/or the technique 900. The technique 800 and/or the technique 900 can be implemented using specialized hardware or firmware. For example, a hardware component configured to perform the technique 800 and/or the technique 900. As explained above, some computing devices may have multiple memories or processors, and the operations described in the technique 800 and/or the technique 900 can be distributed using multiple processors, memories, or both.

For simplicity of explanation, the techniques 800 and 900 are both depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 8, the technique 800 for transcoding a video stream using a learning model trained to predict transcoding quality for user generated video content is shown. At 802, bitrate and quality scores for transcoding user generated video content of a video stream at multiple resolutions are determined, such as by querying a learning model trained to predict transcoding quality for sets of user generated video content at the multiple resolutions using information associated with the user generated video content. The information associated with the user generated video content may, for example, correspond to one or more video frames of the video stream. The video stream includes video frames at an unspecified quality level. The video stream may, for example, be the video stream 602 shown in FIG. 7. Although the video frames may all share a common, unspecified quality level, in some implementations, some of the video frames may have different, unspecified quality levels from others of the video frames.

Determining the bitrate and quality scores for transcoding the user generated video content of the video stream at the multiple resolutions includes receiving, as output of a learning model, predicted delivered quality levels of the video stream for the multiple resolutions and determining sets of bitrate and quality score pairs using the predicted delivered quality levels. A given predicted delivered quality level represents a quality of the video stream when the video stream is transcoded at a specified bitrate for a corresponding one of the multiple resolutions. Each set of bitrate and quality score pairs corresponds to one resolution of the multiple resolutions. The learning model may, for example, be the learning model 712 shown in FIG. 7, which takes video frames of the video stream to be transcoded as input.

The learning model computes the predicted delivered quality levels by processing one or more video frames extracted from the video stream using one or more quality control metrics. The quality control metrics are or refer to metrics which may be applied to measure a quality score for the one or more video frames at different bitrates for a given resolution. The quality control metric used may, for example, be PSNR, PSNR MOS, VMAF, or another quality control metric. Processing the video frames of the video stream using a quality control metric includes determining quality scores for the video frame at different bitrates and for a given target transcoding resolution.

At 804, sets of transcoding parameters to use for transcoding the video stream at one or more of, and possibly for each of, the multiple resolutions are selected according to the bitrate and quality scores, in which each selected set of transcoding parameters corresponds to a different resolution of the multiple resolutions. For each set of bitrate and quality score pairs, and thus for each resolution of the multiple resolutions to which to transcode the video stream, selecting a set of transcoding parameters may include processing each bitrate and quality score pair of the set of bitrate and quality score pairs for that resolution using a non-linear optimization function to determine weighted values associated with a resolution corresponding to the set of bitrate and quality score pairs. A bitrate and quality score pair of the set of bitrate and quality score pairs for a resolution resulting in a highest one of the weighted values is then selected as the set of transcoding parameters for that resolution.

The non-linear optimization function processes the bitrate and quality score pairs of each set of bitrate and quality score pairs using one or more predefined thresholds. For example, the one or more predefined thresholds may relate to one or more of an overall bitrate upper bound, a maximum bitrate allowed at some or all of the multiple resolutions, or a visual quality difference measurement threshold. When the one or more predefined thresholds relate to a visual quality difference measurement threshold, processing each bitrate and quality score pair of the set of bitrate and quality score pairs using the non-linear optimization function includes culling (eliminating) ones of the bitrate and quality score pairs which breach the visual quality difference measurement threshold. For example, each bitrate and quality score pair which breaches the visual quality difference measurement threshold may be removed from the corresponding set of bitrate and quality score pairs. In such a case, the weighted values are determined for remaining ones of the bitrate and quality score pairs in that set.

The visual quality difference measurement threshold refers to whether a noticeable change in quality results from an increase in bitrate. The visual quality difference measurement threshold is breached for a given bitrate and quality score pair at position i within the set of bitrate and quality score pairs when the bitrate value of that pair, B[i], is greater than the bitrate value of the preceding pair in the set, B[i−1], but the difference in the quality score value of that pair, Q[i], and the quality score value of that preceding pair, Q[i−1], is less than the visual quality difference measurement threshold. The specific value of the visual quality difference measurement threshold may be predefined for the quality control metric used to determine the bitrate and quality scores. For example, where VMAF is used, the visual quality difference measurement threshold may be six.

In another example, the one or more predefined thresholds may relate to a weight defined for the resolution corresponding to the set of bitrate and quality score pairs. In such a case, processing each bitrate and quality score pair of the set of bitrate and quality score pairs using the non-linear optimization function includes determining a weighted value for a bitrate and quality score pair of the set of bitrate and quality score pairs by weighting the quality score of the bitrate and quality score pair using the weight. The weights defined for each of the multiple resolutions are determined based on watch time distributions for the multiple resolutions across videos uploaded to the video hosting platform to which the video stream is uploaded for transcoding. Accordingly, resolutions which are more frequently served by the video hosting platform will be weighted more heavily than resolutions which are less frequently served by the video hosting platform.

The determined set of transcoding parameters for a given resolution thus includes a bitrate at which to transcode the video stream to achieve the corresponding quality score at that given resolution. However, each set of transcoding parameters may, in some cases, include other parameters to use for transcoding the video stream. For example, a given set of transcoding parameters may further include one or more of a CRF, a minimum bitrate, or a maximum bitrate. In that the set of transcoding parameters is determined using a learning model trained based on a wide variety of user generated video content of a video hosting platform, the set of transcoding parameters is quality-normalized across the collection of videos of the video hosting platform.

At 806, the video stream is transcoded into multiple transcoded video streams using, for each resolution, the set of transcoding parameters selected for that resolution, in which each of the multiple transcoded video streams is transcoded at the different resolution corresponding the set of the transcoding parameters used for the transcoding. Transcoding the video stream using the selected sets of transcoding parameters may include adjusting an initial CRF for the video stream according to the respective CRFs specified in the selected sets of transcoding parameters.

In some implementations, transcoding the video stream may include compressing the video stream according to the selected sets of transcoding parameters, such as where the transcoding is performed by an encoder or in parallel with encoding operations for the video stream. In some implementations, transcoding the video stream may include processing the video stream according to the selected sets of transcoding parameters other than by compressing the video stream.

At 808, the multiple transcoded video streams are for further processing or storage, such that a transcoded video stream of the multiple transcoded video streams is configured for display at a client device responsive to a selection of a resolution corresponding to the transcoded video stream. For example, a user of the client device may select a particular resolution at which to view the video content of video stream after it has been transcoded at a video hosting platform. The video hosting platform serves the transcoded video stream corresponding to the selected resolution to the client device responsive to that user selection.

Referring next to FIG. 9, a technique 900 for training a learning model to predict transcoding quality for user generated video content is shown. At 902, raw video frames are extracted from a training data set which includes sets of user generated video content of a video hosting platform. The training data set may, for example, include hundreds or thousands of videos of user generated video content at multiple resolutions (e.g., 360p, 480p. 720p, 1080p, 2160p, and/or another resolution). The videos of the training data set may be of the same length (e.g., twenty seconds). In some cases, the videos may be pre-processed, such as to shorten the lengths thereof, before they are included in the training data set. Alternatively, the videos of the training data set may be of different lengths.

Each of the sets of user generated video content included in the training data set includes or otherwise refers to one or more videos hosted at the video hosting platform. The sets of user generated video content include videos of multiple content categories to enable the training of a learning model based on video content, rather than based on bitrate information agnostic to video content. The raw video frames extracted from the sets of user generated video content are video frames taken directly from those sets of user generated video content without pre-processing performed thereon. The raw video frames extracted from a given set of user generated video content may be extracted from within a defined time range of the given set of user generated video content (e.g., within three seconds of each other). Alternatively, there may no limitation as to the time of a given set of user generated video content from which the raw video frames are extracted.

At 904, the raw video frames extracted from the training data set are pre-processed, such as to prepare the raw video frames to be used for training a learning model. Pre-processing the raw video frames can include one or both of converting pixel data of the raw video frames or rescaling the raw video frames. Converting the pixel data of the raw video frames may, for example, include converting pixel data of the raw video frames from RGB color channels to YUV color channels. For example, if the raw video frames are received in RGB color channel format, the RGB color channel information may be converted to YUV color channel information. However, if the raw video frames are received in the YUV color channel format, no such conversion may be performed. Where the pixel data is converted into the YUV color channels, the learning model may be trained using only the pixel data corresponding to the Y color channel of the YUV color channels. Traditionally a learning model such as a CNN (convolutional neural network) uses RGB color channel information as input. However, it has been found that converting RGB color channel information to YUV color channel information and using the Y color channel information alone will achieve the same precision as using full RGB color channel information while reducing the computational effort required. Thus, the UV color channel information may be discarded or otherwise ignored for the purpose of training the learning model.

Rescaling the raw video frames may include determining whether one or more of the raw video frames are in a non-standard resolution (e.g., 1922×1084). For example, the resolution of some or all of the raw video frames may be compared to a defined set of standard resolutions, which may include, but is not limited to, 360p, 480p, 720p, 1080p, and 2160p. A raw video frame is determined to be in a non-standard resolution if the resolution of that raw video frame is not included in the defined set of standard resolutions. Responsive to determining that one or more of the raw video frames are in a non-standard resolution, those raw video frames are rescaled to a standard resolution by padding those raw video frames with zero value coefficients. The standard resolution to which those raw video frames are rescaled is a closest standard resolution with the same aspect ratio to the non-standard resolution at which those raw video frames are extracted from the training data set.

In some implementations, the pre-processing of the raw video frames may be omitted. For example, the raw video frames may in some cases be further processed as described below without pre-processing.

At 906, training side information to use for training the learning model is generated using the pre-processed raw video frames. The training side information may include or refer to one or more feature maps generated for predicting spatial and/or temporal features of the raw video frames. Each feature map may be generated for one of the raw video frames. Where the feature map is generated for predicting spatial features of a raw video frame, the feature map is a two-dimensional map of spatial features generated for example using a Gabor filter. Where the feature map is generated for predicting temporal features of a raw video frame, the feature map is for example a two-dimensional optimal flow of temporal features generated using a reference video frame of the video frame. Adding spatial and temporal features can improve the precision of the prediction by the trained learning model.

In some implementations in which the pre-processing is omitted, the training side information may be generated using the raw video frames without the earlier pre-processing thereof. In some implementations, the generation of the training side information may be omitted.

At 908, a learning model is trained to predict transcoding quality of video content. The learning model is trained using the pre-processed raw video frames extracted from the training data set and using the training side information generated using the spatial and/or temporal features of those pre-processed raw video frames. Training the learning model using that information includes training the learning model to statistically predict the delivered quality of video data that will result from a transcoding at given bitrates for given resolutions, subject to the quality control metrics used and the particular video content of the video data.

The delivered quality of the video data is predicted by transcoding the pre-processed raw video frames of each set of user generated video content of the training data set using each available quality control metric, at each possible CRF, and at each possible resolution. Transcoding the pre-processed raw video frames in this way trains the learning model to determine the bitrate which is used to achieve the associated quality score for each given combination of quality control metric, CRF, and resolution.

The learning model is trained by transcoding the raw video frames into all possible resolutions and encoding formats using multiple possible transcoding configurations. For example, video content of the training data set which is received in 720p resolution may be transcoded into a 144p resolution version, a 240p resolution version, a 360p resolution version, a 480p resolution version, and a 720p resolution version. In another example, video content of the training data set which is encoded using the H.264 codec may be transcoded at some or all constant rate factors (CRFs) in a range of 1 to 51. Accordingly, the learning model 712 may use 255 different transcoding configurations to produce 255 transcoded versions of that particular video content.

Because the particular video content is taken into consideration for training the learning model, the learning model is trained to predict the transcoding quality of user generated video content according to a category of that video content. Thus, the learning model is trained to predict delivered quality levels of the raw video frames of the training data set according to configurations learned for multiple video content categories.

Depending on the particular structure of the learning model training the learning model may include one or more of producing statistical weights at one or more deep learning or convolutional neural network layers, tuning filters applied to those statistical weights, defining one or more new layers, defining other hyper-parameters such as for input and output processing, or the like. In that the particular structure of the learning model may differ based on the particular implementation of this disclosure, the specific way in which the training of the learning model is performed may vary.

After the learning model is trained, the learning model is deployed for inference processing of user generated video content uploaded for transcoding to the video hosting platform. In some implementations, the learning model may be a new learning model, in which case training the learning model includes producing the learning model. In some implementations, the learning model may be a pre-existing learning model, in which case training the learning model includes retraining the learning model. In some implementations in which the pre-processing is omitted, the learning model is trained using the raw video frames without the earlier pre-processing thereof. In some implementations in which the generation of the training side information is omitted, the learning model may be trained without using such training side information.

The aspects of encoding, decoding, and transcoding described above illustrate some examples of encoding, decoding, and transcoding techniques. However, it is to be understood that encoding, decoding, and transcoding, as those terms are used in the claims, could mean compression, decompression, transformation, transcoding, trans-rating, trans-sizing, or another processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the transmitting station 102 and/or the receiving station 106 (and the algorithms, methods, instructions, etc., stored thereon and/or executed thereby, including by the encoder 400, the decoder 500, the transcoder 600, and the transcoder 700, or another encoder, decoder, or transcoder as disclosed herein) can be realized in hardware, software, or any combination thereof. The hardware can include, for example, computers, intellectual property cores, application-specific integrated circuits, programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102 can encode content into an encoded video signal and transmit the encoded video signal to the communications device. In turn, the communications device can then decode the encoded video signal. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law to encompass all such modifications and equivalent arrangements.

What is claimed is:

1. A method for transcoding a video stream of user generated video content uploaded to a video hosting platform, the method comprising:
   determining bitrate and quality scores for transcoding the user generated video content of the video stream at multiple resolutions using a learning model trained using raw video frames of sets of user generated video content hosted at the video hosting platform to process, as input, user generated video contents and to predict, as output, respective bitrate and quality scores for the user generated video contents;
   selecting, according to the bitrate and quality scores, sets of transcoding parameters to use for transcoding the video stream at each of the multiple resolutions, wherein each set of transcoding parameters corresponds to a different resolution of the multiple resolutions;
   transcoding the video stream into multiple transcoded video streams using the selected sets of transcoding parameters, wherein each of the multiple transcoded video streams is transcoded at the different resolution corresponding the set of the transcoding parameters used for the transcoding; and
   outputting the multiple transcoded video streams for further processing or storage at the video hosting platform, wherein a transcoded video stream of the multiple transcoded video streams is configured for display at a client device responsive to a selection of a resolution corresponding to the transcoded video stream.

2. The method of claim 1, wherein determining the bitrate and quality scores for transcoding the user generated video content of the video stream at the multiple resolutions comprises:
   determining sets of bitrate and quality score pairs using predicted delivered quality levels of the video stream for the multiple resolutions, wherein a given predicted delivered quality level represents a quality of the video stream when the video stream is transcoded at a specified bitrate for a corresponding one of the multiple resolutions, and wherein each set of bitrate and quality score pairs corresponds to one resolution of the multiple resolutions.

3. The method of claim 2, wherein the learning model computes the predicted delivered quality levels by processing one or more video frames of the user generated video content extracted from the video stream using one or more quality control metrics.

4. The method of claim 2, wherein each bitrate in a given set of bitrate and quality score pairs is less than or equal to a maximum bitrate allowed for a resolution corresponding to the given set of bitrate and quality score pairs.

5. The method of claim 2, wherein selecting the sets of transcoding parameters to use for transcoding the video stream at each of the multiple resolutions comprises:
for each of the sets of bitrate and quality score pairs:
processing each bitrate and quality score pair of the set of bitrate and quality score pairs using a non-linear optimization function to determine weighted values associated with a resolution corresponding to the set of bitrate and quality score pairs; and
selecting, as one of the sets of transcoding parameters, a bitrate and quality score pair of the set of bitrate and quality score pairs resulting in a highest one of the weighted values.

6. The method of claim 5, wherein the non-linear optimization function processes the bitrate and quality score pairs of each set of bitrate and quality score pairs using one or more predefined thresholds.

7. The method of claim 6, wherein the one or more predefined thresholds relate to one or more of an overall bitrate upper bound, a maximum bitrate allowed at some or all of the multiple resolutions, or a visual quality difference measurement threshold.

8. The method of claim 7, wherein, when the one or more predefined thresholds relate to the visual quality difference measurement threshold, processing each bitrate and quality score pair of the set of bitrate and quality score pairs using the non-linear optimization function comprises:
culling ones of the bitrate and quality score pairs which breach the visual quality difference measurement threshold,
wherein the weighted values are determined for remaining ones of the bitrate and quality score pairs.

9. The method of claim 6, wherein the one or more predefined thresholds relate to a weight defined for the resolution corresponding to the set of bitrate and quality score pairs, wherein processing each bitrate and quality score pair of the set of bitrate and quality score pairs using the non-linear optimization function comprises:
determining a weighted value for a bitrate and quality score pair of the set of bitrate and quality score pairs by weighting the quality score of the bitrate and quality score pair using the weight.

10. The method of claim 9, wherein weights defined for each of the multiple resolutions are determined based on watch time distributions for the multiple resolutions across videos uploaded to the video hosting platform.

11. The method of claim 1, comprising:
extracting the raw video frames from the sets of user generated video content hosted at the video hosting platform; and
training the learning model using video content of the raw video frames.

12. The method of claim 11, wherein training the learning model using the video content of the raw video frames comprises:
pre-processing the raw video frames prior to training the learning model using the video content of the raw video frames.

13. The method of claim 12, wherein pre-processing the raw video frames comprises:
converting pixel data of the raw video frames from RGB color channels to YUV color channels,
wherein the learning model is trained using only the pixel data corresponding to a Y color channel of the YUV color channels.

14. The method of claim 12, wherein pre-processing the raw video frames comprises:
determining whether one or more of the raw video frames are in a non-standard resolution; and
responsive to determining that the one or more of the raw video frames are in the non-standard resolution, rescaling the one or more of the raw video frames to the standard resolution by padding the one or more of the raw video frames with zero value coefficients.

15. The method of claim 11, wherein training the learning model using the video content of the raw video frames comprises:
processing a video frame of the raw video frames using a feature map generated for predicting spatial or temporal features of the video frame.

16. The method of claim 15, wherein the feature map is a two-dimensional map of spatial features generated using a Gabor filter.

17. The method of claim 15, wherein the feature map is a two-dimensional optimal flow of temporal features generated using a reference video frame of the video frame.

18. The method of claim 11, wherein the sets of user generated video content correspond to multiple video content categories, wherein the learning model is trained to predict delivered quality levels of the raw video frames according to configurations learned for the multiple video content categories.

19. An apparatus comprising memory and a processor, wherein the memory includes instructions executable by the processor to:
determine bitrate and quality scores for transcoding user generated video content of a video stream at multiple resolutions using a learning model trained using raw video frames of sets of user generated video content hosted at a video hosting platform to process, as input, user generated video contents and to predict, as output, respective bitrate and quality scores for the user generated video contents;
select, according to the bitrate and quality scores, sets of transcoding parameters to use for transcoding the video stream at each of the multiple resolutions, wherein each set of transcoding parameters corresponds to a different resolution of the multiple resolutions;
transcode the video stream into multiple transcoded video streams using the selected sets of transcoding parameters, wherein each of the multiple transcoded video streams is transcoded at the different resolution corresponding the set of the transcoding parameters used for the transcoding; and
output the multiple transcoded video streams for further processing or storage at the video hosting platform, wherein a transcoded video stream of the multiple transcoded video streams is configured for display at a client device responsive to a selection of a resolution corresponding to the transcoded video stream.

20. A transcoder configured to:
determine bitrate and quality scores for transcoding user generated video content of a video stream at multiple resolutions using a learning model trained using raw video frames of sets of user generated video content hosted at a video hosting platform to process, as input, user generated video contents and to predict, as output, respective bitrate and quality scores for the user generated video contents;
select, according to the bitrate and quality scores, sets of transcoding parameters to use for transcoding the video stream at each of the multiple resolutions, wherein each set of transcoding parameters corresponds to a different resolution of the multiple resolutions;

transcode the video stream into multiple transcoded video streams using the selected sets of transcoding parameters, wherein each of the multiple transcoded video streams is transcoded at the different resolution corresponding the set of the transcoding parameters used for the transcoding; and output the multiple transcoded video streams for further processing or storage at the video hosting platform, wherein a transcoded video stream of the multiple transcoded video streams is configured for display at a client device responsive to a selection of a resolution corresponding to the transcoded video stream.

\* \* \* \* \*